United States Patent [19]
Todt

[11] 3,876,302
[45] Apr. 8, 1975

[54] HIGH SPEED LOW INERTIA SCANNING SYSTEM FOR A COPYING MACHINE

[75] Inventor: Joachim H. Todt, Park Ridge, Ill.

[73] Assignee: A. B. Dick Company, Niles, Ill.

[22] Filed: Nov. 2, 1972

[21] Appl. No.: 303,139

[52] U.S. Cl.................................. 355/66; 355/8
[51] Int. Cl........................................ G03g 15/02
[58] Field of Search ............. 355/8, 46, 59; 355/65, 355/66

[56] References Cited
UNITED STATES PATENTS

| | | | |
|---|---|---|---|
| 3,512,886 | 5/1970 | Wirley | 355/8 X |
| 3,689,145 | 9/1972 | Kawakubo | 355/8 |
| 3,703,334 | 11/1972 | Knechtel | 355/57 X |
| 3,709,602 | 1/1973 | Satomi | 355/49 |
| 3,740,137 | 6/1973 | Sato | 355/8 |

OTHER PUBLICATIONS

Miller, M. J. "Scanning System Incorporating Translating & Rotating Mirrors," IBM, Tech. Dis. Bul., Vol. 15, No. 4, pp. 1,256 (Sept 1972).
Queener, C. A. "Optics/Scanning for Copier with Stationary Flat Document Plane," IBM, Tech. Dis. Bul., Vol. 15, No. 9, pp. 2683 (Feb. 1973).

Primary Examiner—Samuel S. Matthews
Assistant Examiner—E. M. O'Connor

[57] ABSTRACT

A lens is mounted for focusing an image onto the surface of a xerographic drum from either of two document supporting platens. A parallel linkage assembly includes first, second and third mirror carriages. A first mirror is mounted on the first carriage by selector means permitting the first mirror alternately to occupy either of two positions relative to such carriage. A second mirror is mounted on said second carriage and cooperates with the first mirror, when the same occupies one of its positions, to define a first folded optical path passing through said lens and extending between one of the platens and the drum. A third mirror is mounted on said third carriage and cooperates with the first mirror, when the same occupies the other of its positions, to define a second folded optical path passing through said lens and extending between the other platen and the drum. Drive means engaged with said linkage assembly oscillates all of said mirrors for scanning. Cam means cooperates with the drive means to impart bodily shifting movement to at least one of said mirrors to maintain the length of the optical path constant during scanning.

23 Claims, 11 Drawing Figures

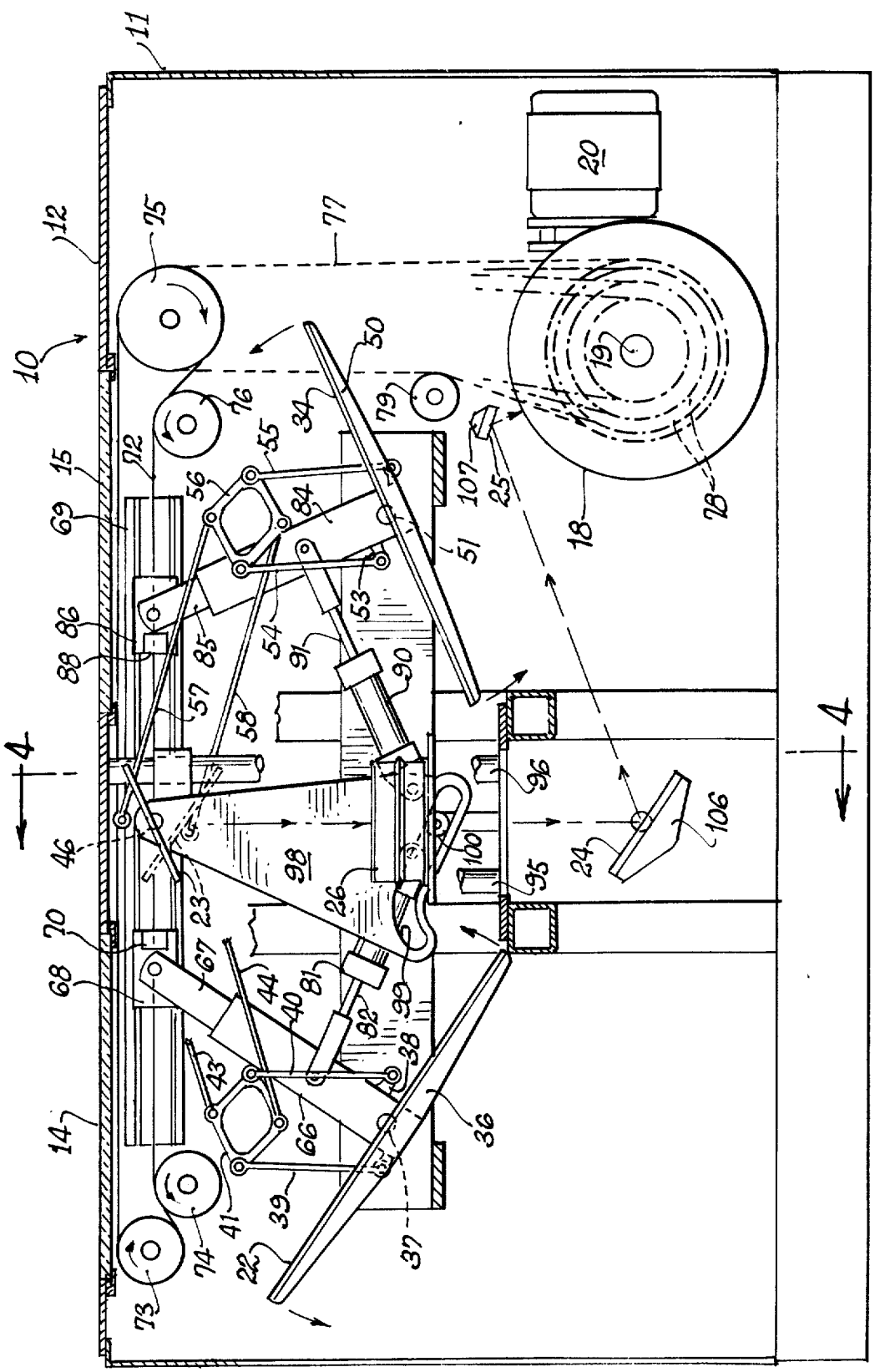

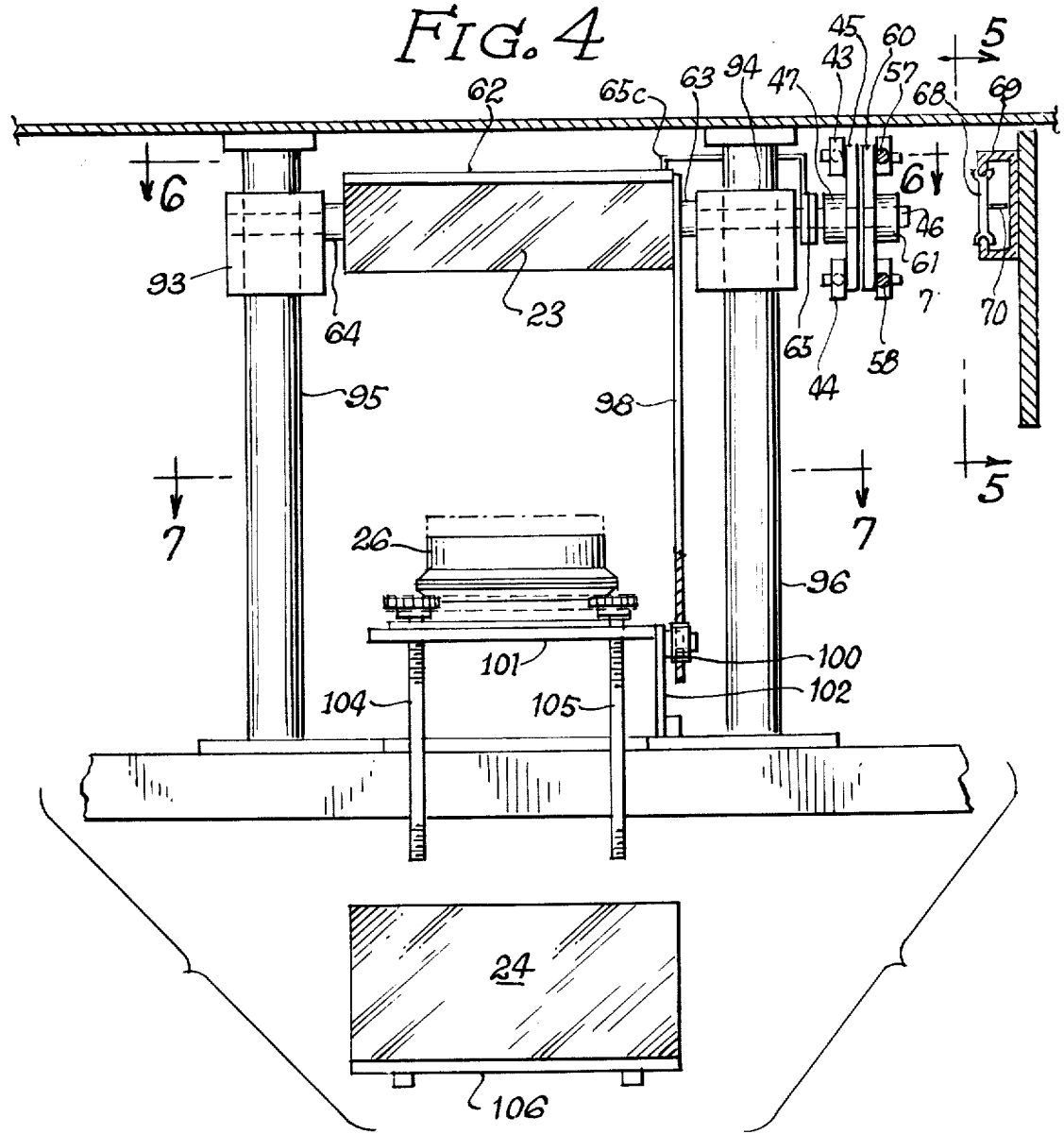

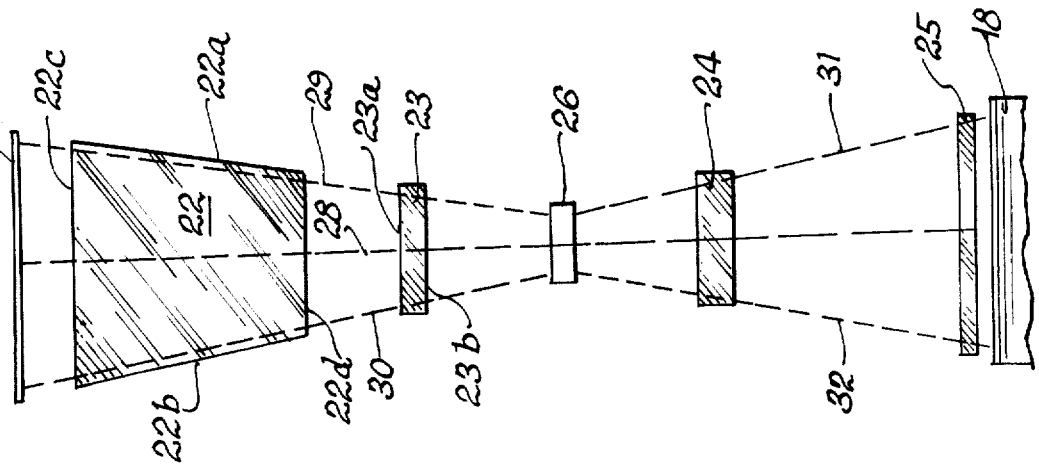
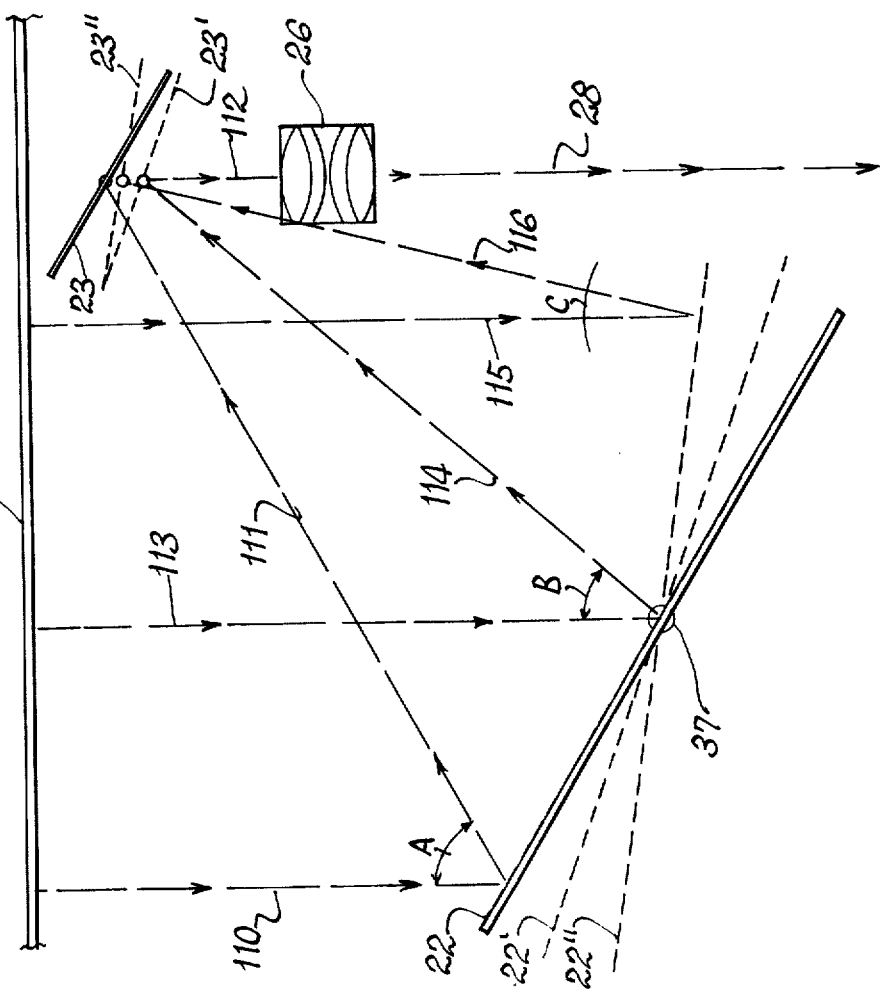

3,876,302

HIGH SPEED LOW INERTIA SCANNING SYSTEM FOR A COPYING MACHINE

BACKGROUND OF THE INVENTION

1. Field of the Invention

The present invention relates in a general way to copying machines. More particularly, the present invention relates to high speed scanning systems, forming part of such machines for projecting information on a line-by-line basis from a document to a moving image recording surface.

2. The Prior Art

High speed scanning systems of the type under consideration are known in the prior art. However, such high speed systems which are practical and reliable in operation utilize curved platens. In these systems, the curved platen is necessary to maintain the length of the optical path constant. As is known to those skilled in the art, curved platens are disadvantageous at least for the reason that it is difficult to copy certain documents or material, such as a relatively thick book, for example.

It is known in the prior art to provide scanning systems utilizing flat platens. Representative prior art patents showing scanning systems with flat platens are: Mayo et al. U.S. Pat. No. 3,062,109; Wick U.S. Pat. No. 3,431,053; Watanabe U.S. Pat. No. 3,497,298 and Hoskins U.S. Pat. No. 3,524,928. The scanning systems shown in these patents are not adapted for high speed operations, i.e., for scanning a document sixty or more times per minute to make a corresponding number of copies. These prior art systems scan the document by reciprocating a component of the optical system for scanning a document on a line-by-line basis from one edge to the opposite edge thereof; the length of the optical path remains constant as the optical component reciprocates in a plane perpendicular to the optical path. These prior art flat platen scanning systems are not suitable for such high speed operation because they achieve scanning by reciprocating at least one member in the optical path, e.g., a mirror or lens, through a stroke of rather substantial distance during each scanning cycle. When attempts are made to increase the speed of movement of such member of the optical system to achieve high speed scanning, the resulting forces generated are too great for reliable and safe operation. These substantial forces are generated because the amount of movement is substantial, because the movement is reciprocal and also because the member moved is of substantial mass.

SUMMARY AND OBJECTS OF THE INVENTION

The present invention may be summarized as relating to a method and apparatus for providing a high speed, low inertia scanning system, the components of which are moved at relatively slow speeds as compared with the scanning speed.

A primary object of the present invention is the provision of a new and improved high speed scanning system including a folded optical path defined by a pair of mirrors, wherein such mirrors are oscillated in parallel relationship with each other and wherein bodily shifting movement is imparted to one of the mirrors during such oscillation thereby to maintain the length of the optical path constant during scanning.

Another object of the present invention is the provision of a high speed scanning system including a folded optical path constituted by a pair of mirrors and a lens, such mirrors being oscillated in parallel relationship with each other and one of the mirrors being bodily shifted during such oscillation, such that the angle defined by adjoining portions of the optical path is varied according to the tangent function of the angle and such that at least two portions of the optical path are varied in length according to the cosine function of the angle thereby to maintain the length of the optical path constant during scanning.

Still another object of the present invention is the provision of a scanning system according to the foregoing objects wherein the mirrors are rocked through a relatively small acute angle and wherein the one mirror is bodily shifted through a distance substantially less than the length of the document being scanned.

Another object of the present invention is the provision of a scanning system of the type described which includes two document supporting platens whereby such platens may be alternately scanned at high speed.

Yet another object of the present invention is the provision of a high speed scanning system of the type described wherein the required movements to the components of the optical path may be brought about by the use of simple mechanical parts as opposed to complicated cams.

These and other objects and advantages of the present invention will become apparent from the following specification disclosing a preferred embodiment shown in the accompanying drawings.

DESCRIPTION OF THE DRAWINGS

FIG. 3 is an enlarged section taken along the line 3—3 of FIG. 2;

FIG. 4 is an enlarged section taken along the line 4—4 of FIG. 3;

FIG. 5 is a section taken along the line 5—5 of FIG. 4;

FIG. 9 is a diagrammatic view showing the operation of the present invention;

FIG. 10 is a diagrammatic view showing the optical path unfolded for purposes of illustration.

DESCRIPTION OF A PREFERRED EMBODIMENT

Figure 1:
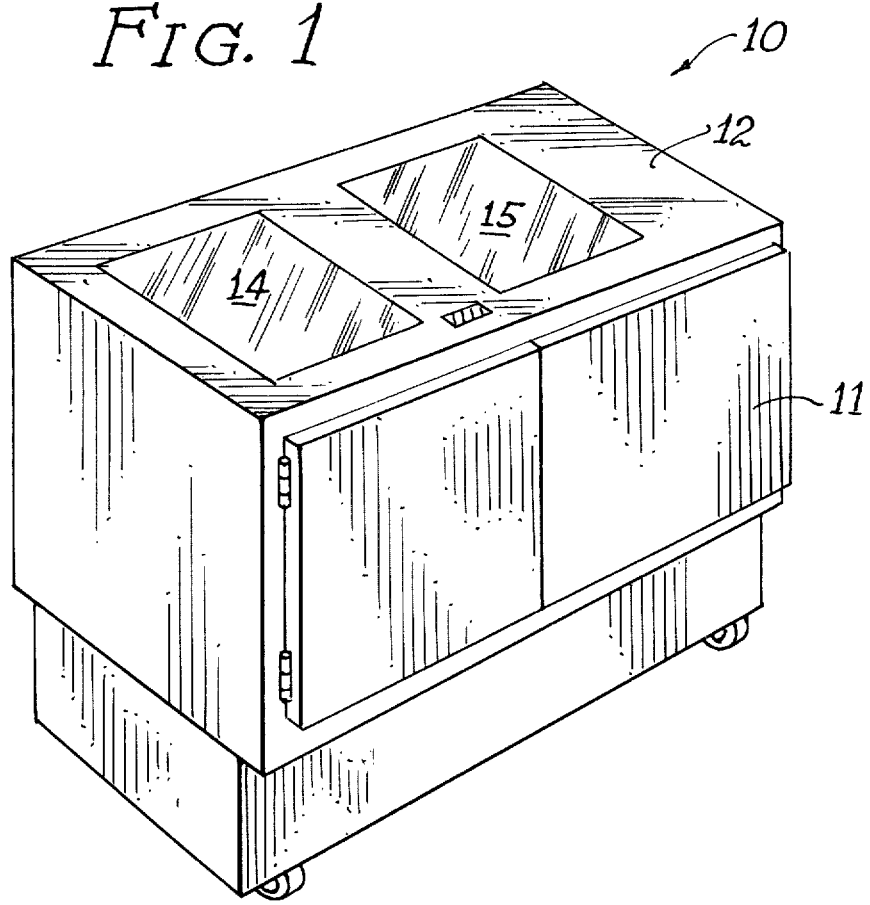
FIG. 1 is an isometric view of a copying machine embodying the scanning system of the present invention.

Referring now to the drawings, the present invention is shown incorporated in an electrostatic copying machine, generally designated 10, and including a cabinet 11 in the form of a parallelepiped having a top wall 12. The top wall 12 includes two rectangular shaped apertures receiving flat glass plates or platens 14 and 15. As will be explained herein, the flat platens define two copying stations for the alternate copying of documents supported on each platen. As noted in FIG. 2, a document 16 is supported face down on the platen 14; a document 17 is supported face down on the platen 15.

Referring to FIG. 3, a drum 18 having a photoconductive surface thereof, for example, vitreous selenium or sensitized polyvinyl carbazole, is mounted for rotation about a shaft 19, which shaft is driven by an electric motor 20. The drum 18 forms part of equipment for making copies of documents by the well known electrophotographic copying process. It is only necessary to state that the photoconductive coating on the drum 18 receives an electrostatic charge and is then exposed to an image of an original document to produce a latent electrostatic image of the original. The present invention has to do with the method and apparatus for scanning the original and projecting an image of the information on the original document on a line-by-line basis to the moving surface of the drum 18.

When the platen 14 is being scanned, the scanning system is constituted by a folded optical path including mirrors 22, 23, 24, 25 and a lens assembly 26. By way of introduction, reference should be made to FIG. 10 which is a diagrammatic view of this optical system, with the optical path being unfolded for purposes of illustration. The centerline of the folded optical path is designated 28. The outermost rays of light focused by the lens assembly 26 between such lens and the platen 14 are designated 29, 30; the outermost rays between the lens and the drum 18 are designated 31, 32. The mirrors 23, 24 and 25 may be conveniently formed in rectangular shape. The mirror 22, which has a surface area substantially larger than the area of the other mirrors, preferably is in the form of a trapezoid having inclined side edges 22a, 22b parallel with the rays 29 and 30, the other two edges 22c, 22d of this mirror being parallel with each other. When the platen 15 is scanned, a similar folded optical path is defined, the exceptions being that the mirror 23 is pivoted to a different position and a mirror 34 is used in lieu of the mirror 22. It will be understood that the mirror 34 is of substantially the same size and shape as the mirror 22.

Referring primarily to FIG. 3, the flat mirror 22 is supported by a carriage 36, which carriage is pivotally mounted by a shaft 37. It will be understood that the carriage 36 mounts the mirror 22 for oscillating or pivoting movement about an axis coaxial with the shaft 37, which axis is contained within the plane of the mirror and is parallel with the mirror edges 22c, 22d. This axis preferably passes through the center of mass of the mirror 22 and carriage 36.

The shaft 37 mounts an arm 38 for movement therewith, opposite ends of this arm being pivotally engaged with corresponding ends of a pair of parallel links 39, 40. The other ends of these links are pivotally connected with a diamond-shaped crank 41. This crank is pivotally connected to corresponding ends of another pair of parallel links 43, 44. The other ends of these links are pivotally connected to an arm 45 (FIG. 4), which arm is rotatably mounted on a shaft 46. A clutch 47 associated with the arm 45 permits the latter to impart rotation to the shaft 46 upon actuation of the clutch.

The flat mirror 34 is supported by a carriage 50, which carriage is pivotally mounted about a shaft 51. It will be understood that this carriage mounts the mirror 34 for pivoting or oscillating movement about an axis coaxial with the shaft 51, which axis is contained within the plane of the mirror and is parallel with opposite edges of the mirror. The shaft 51 mounts an arm 53 for movement therewith, opposite ends of this arm being pivotally engaged with corresponding ends of a pair of parallel links 54, 55. The other ends of these links are pivotally connected with a diamond-shaped crank 56. Corresponding ends of another pair of parallel links 57, 58 are pivotally connected with the crank 56. The other ends of these links are pivotally connected with opposite ends of an arm 60, which arm is rotatably mounted on the shaft 46. A clutch 61 associated with the arm 60 permits the latter to impart rotation to the shaft 46 upon actuation of this clutch.

Figure 6:
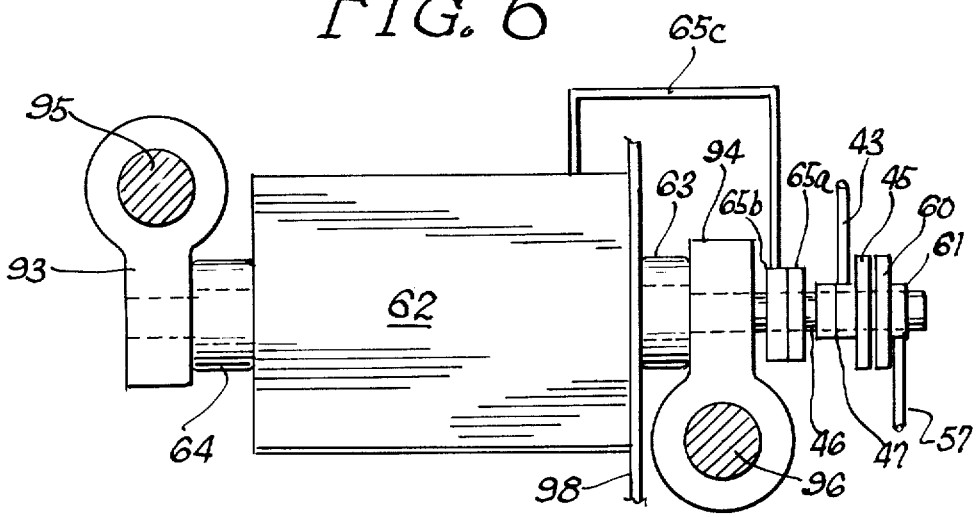
FIG. 6 is a section taken along the line 6—6 of FIG. 4.
Figure 7:
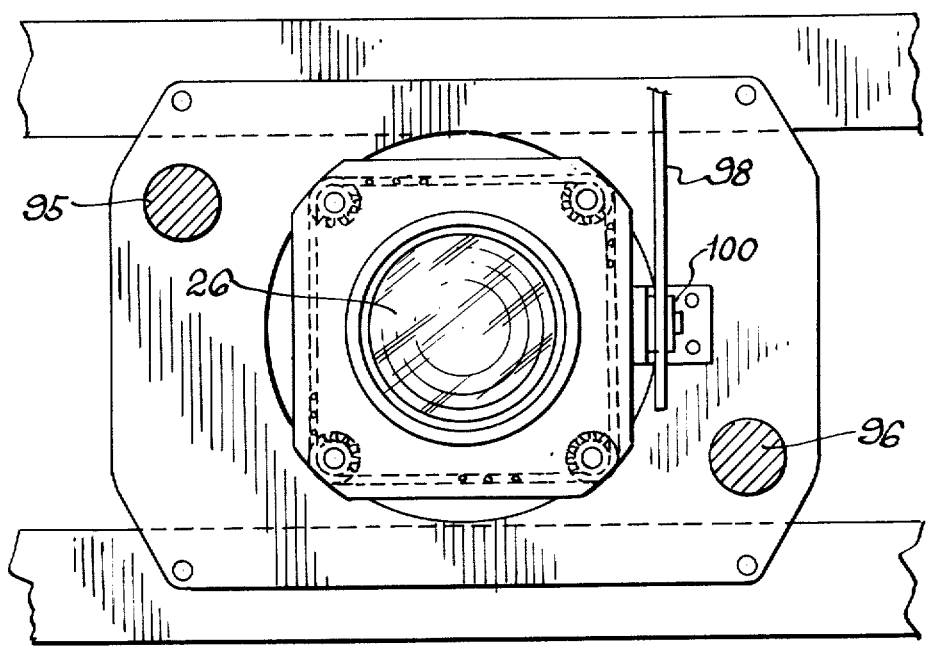
FIG. 7 is a section taken along the line 7—7 of FIG. 4.
Figure 8:
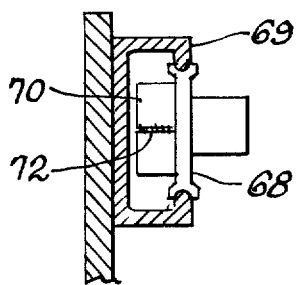
FIG. 8 is an enlarged section taken along the line 8—8 of FIG. 5.

As best seen in FIGS. 4 and 6, a carriage 62 includes hubs 63, 64 mounting the carriage on the shaft 46; this carriage supports the mirror 23. A rotary solenoid 65 is mounted on the shaft 46. One part 65a of the solenoid is rotated by the shaft. Another part 65b of the solenoid is movable relative to the shaft and is connected to the carriage 62 by a bracket arm 65c. The solenoid part 65b alternately occupies two positions in response to energization and de-energization of the solenoid 65. In each of these positions, the solenoid part 65b is rotated or driven by the solenoid part 65a, the latter being fixed to the shaft 46. In one position of the solenoid part 65b, the carriage 62, movable with this solenoid part by reason of the bracket arm 65c, will position the mirror 23 in parallel relationship with the mirror 22. When the solenoid part 65b is in its other position, the mirror 23 will be located in parallel relationship with the mirror 34. By reason of the parallel linkage described above, the mirror 23 will always be pivoted or oscillated in parallel relationship with the selected mirror 22 or 34. The mirror 23 is oscillated about an axis parallel with and equidistant of its edges 23a, 23b (FIG. 10), this axis being contained within the plane of the mirror.

It will be understood that when the mirror 23 is located in its position in parallel relationship with the mirror 22, the clutch 47 will be engaged so as to cause oscillating movement of the mirror 23 by reason of the parallel links 39, 40 and 43, 44. With the mirror 23 so positioned, the clutch 61 will be disengaged; accordingly, rotation from the shaft 46 is not transferred to the shaft 60 and therefore the mirror 34 is not rocked. When the mirror 23 is located in its other position parallel with the mirror 34, the clutch 61 will be engaged and the clutch 47 disengaged, thereby to cause only the mirror 34 to oscillate with the mirror 23.

An arm 66 has one end thereof connected to the mirror carriage 36 for movement in unison therewith. This arm is in telescoping engagement with another arm 67, the latter being pivotally engaged with a carriage 68. This carriage is mounted for reciprocal sliding movement along a track 69. The carriage 68 includes an electrically actuated clutch 70 for gripping engagement with a belt 72. The belt 72 is supported by rollers 73, 74, 75, 76. The roller 75 is driven from a belt 77, which belt may be mounted on any one of a plurality of hubs 78, such hubs being mounted on the shaft 19 for being driven by the motor 20. The hubs of different diameters provide a means for varying the speed of scan for the purpose of reducing the size of the copy material as will become apparent herein. A movably mounted idler roller 79 maintains proper tension in the belt 77. It should be mentioned that the roller 75 is driven by the belt 77 in a clockwise direction as seen in FIG. 3.

A fluid operated cylinder 81 is pivotally mounted to the frame of the electrostatic copying machine. The piston rod 82 of this cylinder is pivotally connected to the arm 66. As will be explained hereinbelow, the fluid operated cylinder 81 is provided to return the mirror 22 to its start position, i.e., to swing the mirror 22 in a clockwise direction as seen in FIG. 3.

An arm 84 is connected to the mirror carriage 50 for movement in unison therewith. This arm is in telescoping engagement with another arm 85, the latter being mounted to a carriage 86. This carriage is also mounted for reciprocal sliding movement in the track 69 and includes a clutch 88 for selective engagement with the belt 72. A fluid operated cylinder 90 has one end thereof pivotally mounted to the frame of the copying machine. The piston rod 91 associated with this cylinder is pivotally engaged with the arm 84 for providing return movement of the mirror 34 to its start position, i.e., to impart pivoting movement of the mirror 34 in a clockwise direction as seen in FIG. 3.

As best seen in FIGS. 4 and 6, the shaft 46 is rotatably carried by a pair of journal members 93, 94, which journal members are mounted for vertical reciprocal sliding movement on respective uprights 95, 96. These uprights are suitably fixedly mounted from the framework of the copying machine.

It will be apparent that the carriage 62 is mounted for vertical reciprocal movement on the uprights 95, 96. The carriage 62, which supports the mirror 23, is connected with a cam plate 98. The cam plate 98 includes a cam slot or track 99, in which a roller 100 is received. The roller 100 is fixedly mounted by angle or bracket members 101, 102, as best seen in FIG. 4. It will be understood that the cam plate 98 is pivoted or rocked in its own plane in response to oscillation of the shaft 46. Such movement of the cam plate will result in up and down or reciprocal movement of the carriage 62 due to the action of the roller 100 received in the cam track 99. In other words, this cam plate 98 imparts vertical reciprocal bodily shifting movement to the mirror 23 when the latter is being oscillated in parallel relationship with either the mirror 22 or the mirror 34.

The lens assembly 26 is fixedly mounted by plates 104, 105. Adjustment means (not shown) may be provided to move the lens assembly 26 up and down for magnification and demagnification thereby to vary the size of the latent electrostatic image which is focused on the drum 18.

The mirror 24 is fixedly mounted along the axis defined by the lens assembly 26, as by means of a bracket 106. The mirror 25 is also fixedly mounted adjacent the surface of the drum 18, as by means of a bracket 107.

The operation of the embodiment of the invention as just described is as follows:

Assume that the document 16 on the platen 14 is to be scanned. Accordingly, the mirror 23 will be located in the broken line position shown in FIG. 3, i.e., in parallel relationship with the mirror 22. The clutch 47 will be actuated for coupling or connecting the arm 45 with the shaft 46; the clutch 61 will be disengaged allowing the shaft 46 to rotate relative to the arm 60.

Figure 2:
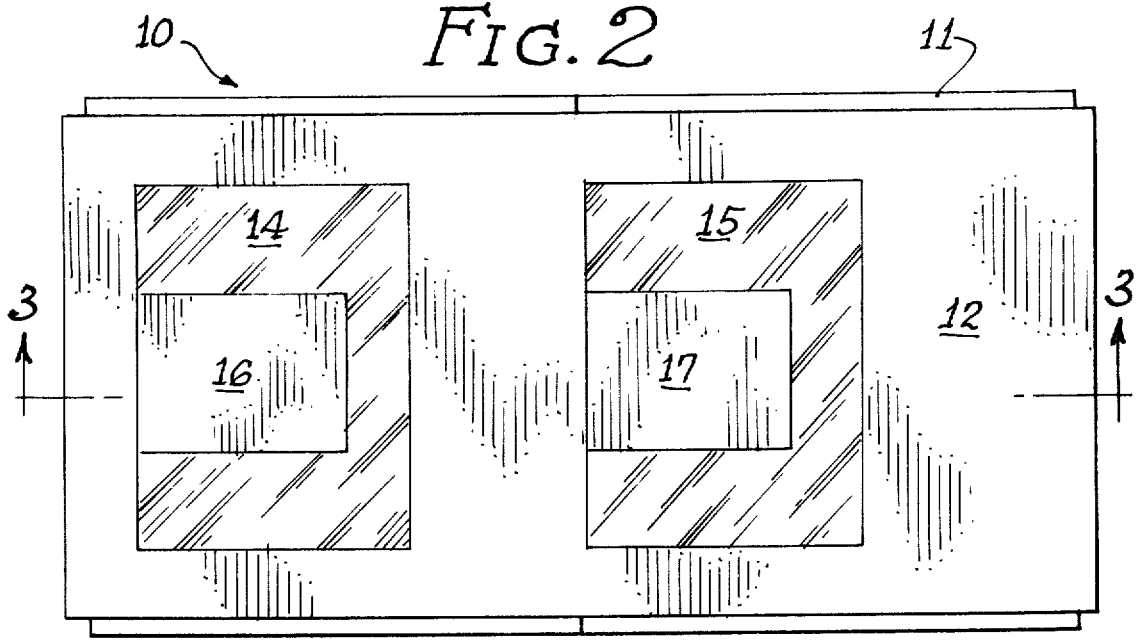
FIG. 2 is a top plan view of the copying machine shown in FIG. 1.

It will be understood that the document 16 is scanned from left to right as viewed in FIG. 2. At the beginning of the scanning cycle, the mirror 22 will be angularly disposed as illustrated in FIG. 3. Accordingly, the intelligence or information along the left marginal portion of the document 16 will be focused as a line onto the surface of the drum 18 by a folded optical path constituted by the mirrors 22, 23, lens assembly 26, and mirrors 24, 25. Of course, the mirror 22 "sees" or reflects all of the intelligence or information on the face of the document 16. However, only the line of information along the left marginal portion of the document 16 is reflected by the mirror 23 through the center of the lens assembly 26 for being focused onto the drum.

Assume that the motor 20 has been energized to drive the drum 18 as well as the belt 72. When it is desired to commence the scanning cycle, the clutch 70 associated with the carriage 68 is activated whereupon the carriage will be connected with the traveling belt 72 and thereby move from right to left as seen in FIG. 3. This will cause the mirror 22 to be rocked in a counterclockwise direction about the axis defined by the shaft 37. By reason of the parallel linkage arrangement, the mirror 23 will also be rocked in a counterclockwise direction about the shaft 46 in parallel relationship with the mirror 22. This swinging movement of the mirrors 22, 23 will result in scanning of the document 16 on a line-by-line basis from left to right.

During the oscillating movement just described, the cam plate 98 will act to impart reciprocal or bodily shifting movement to the mirror 23. This bodily shifting movement of the mirror 23 causes the length of the optical path between the platen 14 and the lens assembly 26 to remain constant as the document is scanned; the length of the optical path between the lens assembly 26 and the surface of the drum 18 is of course fixed.

The operation of the present invention may be best understood by reference to FIG. 9. At the beginning of the scan cycle, the legs or portions of the folded optical path between the document 16 and the lens assembly 26 are designated 110, 111 and 112. The light ray or optical path portion 110 defines angle A with the portion 111. When the mirror 22 is in an intermediate position during the scan cycle, the folded optical path between the lens assembly 26 and the line of information on the document 16 which is being focused by the lens assembly 26 is constituted by the legs or portions 113, 114 and 112; the adjoining portions 113, 114 define an angle B. When the mirror 22 has been swung to its full counterclockwise position, the optical path is defined by the legs or portions 115, 116 and 112. An angle C is defined by the adjoining optical path portions 115, 116.

It is noted that the optical path portion 113 is greater in length than the corresponding optical path portion 110. The length of the optical path between the platen 14 and the lens assembly 26 is maintained constant by the aforementioned bodily shifting movement of the mirror 23 due to the action of the cam plate 98. In other words, when the mirror 22 is in the solid line position, the mirror 23 is in its solid line position shown in FIG. 9. When the mirror 22 is in the broken line position indicated as 22', the mirror 23 will occupy the broken line position designated 23'. It is noted that in this position the mirror 23 has been shifted closer to the lens assembly 26. When the mirror 22 occupies the broken line position indicated as 22", the mirror 23 will occupy the broken line position indicated as 23". It is seen that in this position, the mirror 23 has been moved away from the lens assembly 26, but is not as far away from such lens as it was at the beginning of the scan cycle.

As mentioned above, the optical path portions 110, 111 define an angle A. As can be seen from FIG. 9, the angle B defined by portions 113, 114 is less than the angle A. The optical path portions 115, 116 define the angle C which is less than the angle B. The angles constituted by these rays progressively decrease as the mirror 22 scans the document during the course of counterclockwise swinging movement of such mirror. The geometry of the optical system according to the present invention is such that this variation in the angle is nonlinear and is defined by the tangent function of the angle. Further, the geometry of this system is such that the shifting or reciprocal movement of the mirror 23 along the optical axis 112 is defined by the cosine function of the same angle.

When the mirror 22 has been rocked to its full extent in the counterclockwise direction and scan of the document completed, the clutch 70 is de-energized thereby disengaging the carriage 68 from the traveling belt 72. Substantially simultaneously, the fluid operated cylinder 81 will be energized thereby to swing the mirror 22 in a clockwise direction for returning the same to the start position. This system is now ready for repeated scan of the document 16 or for scanning another document to be placed on the platen 14.

It it is desired to scan a document on the platen 15 while the document on the platen 14 is being changed, the rotary solenoid is activated for swinging the mirror 23 relative to its carriage 62 so as to bring the mirror 23 into parallel relationship with the mirror 34. At the same time, the clutch 47 is deactuated and the clutch 61 actuated for coupling the arm 60 with the shaft 46.

The mirror 34 is illustrated in FIG. 3 in its position at the beginning of a scan cycle. It will be understood that a document on the platen 15, such as the document 17, will be scanned on a line-by-line basis from left to right in the same manner as just described in connection with scanning of a document on the platen 14. During scanning of a document on the platen 15, the mirror 22 will remain stationary due to deactuation of the clutch 47.

Figure 11:
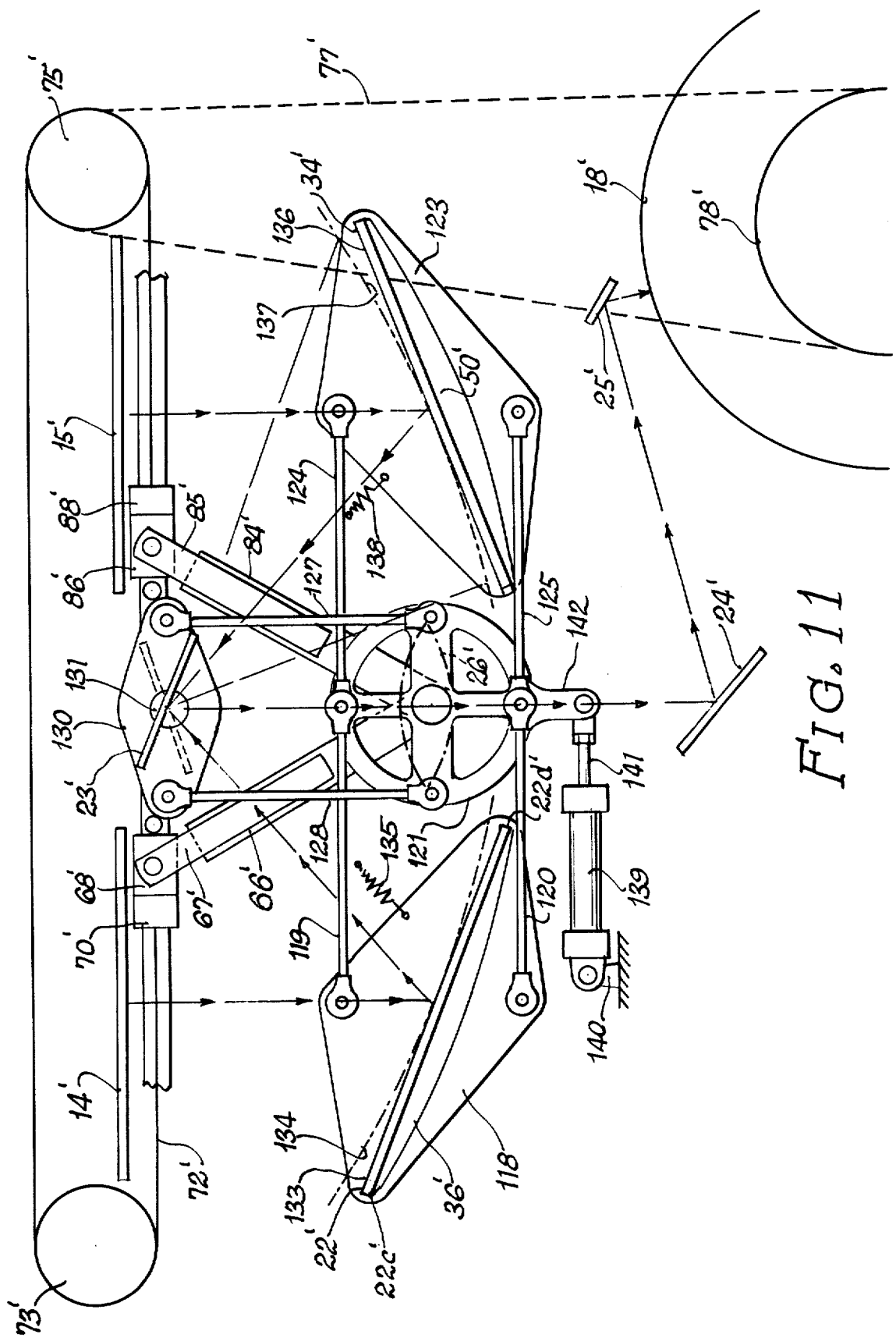
FIG. 11 is a side elevational view of an alternate embodiment.

Another embodiment of the invention is illustrated in FIG. 11. The parts of this embodiment which correspond to the parts of the embodiment already described are designated by the prime form of numeral.

The carriage 36' mounting the mirror 22' is connected to an end plate 118 for movement therewith. This end plate is pivotally connected with corresponding ends of a pair of parallel links 119, 120. The other ends of these links are pivotally connected to a circular crank 121.

The carriage 50' mounting the mirror 34' is connected with an end plate 123 for movement therewith. This end plate is pivotally engaged with corresponding ends of a pair of parallel links 124, 125. The other ends of these links are pivotally connected to the circular crank 121 about the same axes defining the pivotal connections between such crank and the links 119, 120.

Corresponding ends of a pair of parallel links 127, 128 are pivotally connected to the circular crank 121. The other ends of these links are pivotally engaged with opposite ends of an arm 130, which are imparts movement to a shaft or carriage 131, the latter mounting the mirror 23'. Suitable means, such as the rotary solenoid mentioned above, are provided so that the mirror 23' may occupy either of two positions relative to the carriage 131 adapting the copying machine for alternate scanning on platens 14', 15'. The mirror 23' is shown in solid lines in one of its positions wherein it is in parallel relationship with the mirror 22'; when the mirror 23' is in its broken line position shown in FIG. 11, the same is in parallel relationship with the mirror 34'.

The carriage 36' includes a rectilinear cam element 133 coplanar with the mirror 22' and extending between the mirror edges 22c' and 22d' at a right angle thereto. For example, the cam element 133 may be in the form of a metal strip extending along the adjacent marginal portion of the mirror 22'. Suitable means (not shown) fixedly mount an arcuate cam element 134; this cam element may also be in the form of a strip having a length at least equal to the length of the cam strip 133. A spring 135 is attached to the plate 118 urging the same upwardly and to the right for holding the cam element 133 in engagement with the cam element 134. Since the cam element 134 is arcuate and since the co-operating cam element 133 is planar, it is apparent that these two cam elements will impart a rocking or shifting movement to the carriage 36' and mirror 22' supported thereby.

The carriage 50' includes a rectilinear cam track 136 identical but opposite hand with the cam element 133. Also, a fixedly mounted arcuate cam element 137 is provided, this cam element being identical but opposite hand with the arcuate cam element 134. A spring 138 is attached to the plate 123 for holding the cam element 136 in engagement with the cam element 137.

The mirrors in the embodiment illustrated in FIG. 11 are pivoted or swung in a counterclockwise direction by either one of the carriages 68', 86' which may be brought into driven relationship with the belt 72' by energization of the respective clutches 70', 88'. Return, i.e., clockwise movement, of the mirrors is brought about by a fluid operated cylinder 139, one end thereof being pivoted to a bracket 140 mounted from the frame of the machine. A piston rod 141 associated with this fluid cylinder is pivotally mounted to an arm 142, the latter extending from the circular crank 121. In the embodiment of the invention illustrated in FIG. 11, all three of the mirrors oscillate irrespective of whether the platen 14' or 15' is being scanned. However, it is apparent that suitable disconnect means could be provided so that the mirrors 22', 34' may be alternately oscillated depending on whether the platen 14' or 15' is to be scanned.

In the FIG. 11 embodiment, the only movement imparted to the mirror 23' is pivoting or oscillating movement about an axis contained within the plane of this mirror. However, the mirrors 22', 34' have bodily shifting movement imparted thereto as well as oscillating movement. This bodily shifting movement is caused by the action of the cam elements 133, 134 and 136, 137. In other words, each of the mirrors 22', 34' is bodily shifted during scanning so as to maintain a constant length optical path between each of the platens 14', 15' and the lens assembly 26'. Each of the mirrors 22', 34' is oscillated about an axis contained in the plane of the mirror, i.e., the plane established by the face or outer surface of the mirror, which axis shifts from one end of the mirror to the opposite end thereof.

The operation of the embodiment of the invention shown in FIG. 11 is the same in principle as the embodiment of FIGS. 1 through 10. The aforementioned variations in the angles defined by adjoining portions of the optical path according to the tangent function of the angle hold true in the FIG. 11 embodiment. Also, the aforementioned bodily shifting of the mirror 23 according to the cosine function of the angle holds true with respect to the bodily shifting movement of the mirrors 22', 34'.

In each of the embodiments described above, the mirrors are oscillated through a relatively small angle thereby contributing to the low inertia of the system and permitting high speed copying. In the embodiment illustrated, the mirrors oscillate or rock through an angle of approximately 30°. The fastest moving elements in the scanning system are the carriages 68, 86; these carriages move at a speed which is only approximately 40 per cent of the scan speed. By the term "scan speed" reference is had to the period of time required to scan a document from one marginal extremity thereof to the opposite marginal extremity. It should also be pointed out that the extent of bodily shifting movement of the mirror 23 or mirrors 22', 34' is small as compared to the total scan distance. That is to say, the mirror 23 reciprocates along a path having a stroke length substantially less than the scan distance; similarly, in the FIG. 11 embodiment any and all points on the mirrors 22' and 34 are swung through arcs and with the lengths of their strokes of movement substantially less than the scan distance. By the term "scan distance" reference is had to the distance between the just mentioned marginal extremities of the scanned document.

The movement of the various parts of the system of course bear a proportional relationship to the speed of movement of the drum, since the scanning system is driven from the same power source which rotates the drum. In this regard, it will be noticed that the aforementioned tangent and cosine functions bear a relationship with the angular or rotational motion of the drum 18. This result obtains because the shaft 19 which drives the drum also drives the various belts which are used to impart scanning movement to the mirrors in the folded optical system. This relationship is of course independent of the particular drum speed. Variations in the size of the image to be formed on the drum may be achieved by selecting the different diameter hubs 78 thereby to change the speed of the belt 75. Irrespective of which of the hubs 78 is to be used, there is always a relative standstill or non-motion of the projected image of the line of information onto the surface of the drum 18.

It is noted that the drum "sees" each line of information on the original material as if looking at the material at right angles thereto. That is to say, the end of the optical path at the platen 14 is at a right angle to such platen. Similarly, the end of the optical path extending to the platen 15 is at a right angle thereto. The end of the optical path at the drum 18 is at a right angle to an imaginary plane tangential to the surface of the drum. Of course, the scanning system according to the present invention is not to be limited for use with a copying process employing a rotating drum, as the photosensitive surface could be constituted by a moving planar surface.

We claim:

1. In a system of the type adapted to scan a document placed on a flat platen for projecting information contained thereon on a line-by-line basis to a moving image recording surface, the improvement comprising:
    a. a flat platen having first and second opposite edges parallel with each other;
    b. means defining a folded optical path extending between said platen and said surface, the respective end portions of said path being perpendicular to said platen and said surface, which optical path means include at least a pair of mirrors and a lens;
    c. first support means mounting said mirrors for oscillating movement in constant parallel relationship with each other for scanning said platen from said first edge to said second edge thereof;
    d. second support means mounting one of said mirrors for shifting movement during said oscillating movement, said first and second support means cooperating such that during said movement of said mirrors the angle defined by adjoining portions of the optical path is varied according to the tangent function of the angle and such that at least two portions of the optical path are varied in length according to the cosine function of the angle thereby to maintain the length of said optical path substantially constant; and
    e. one of said mirrors extending in one direction for a distance at least as great as the distance between said edges whereby scanning is achieved without moving any of said mirrors along a path in parallel relation with said platen.

2. In a system of the type adapted to scan a document placed on a flat platen for projecting information contained thereon on a line-by-line basis to a moving image recording surface, the improvement comprising:
    a. means defining a folded optical path extending between said platen and said surface, the respective end portions of said path being perpendicular to said platen and said surface, which optical path means include at least a pair of mirrors and a lens;
    b. pivot means mounting said mirrors for oscillating movement in constant parallel relationship with each other and about respective parallel spaced axes thereby to scan a document on said platen from one edge to the opposite edge thereof;
    c. cam means mounting one of said mirrors for shifting movement during said oscillating movement; and
    d. said pivot means and said cam means cooperating such that during said oscillating and shifting movement of said mirrors the angle defined by adjoining portions of the optical path is varied according to the tangent function of the angle and such that at least two portions of the optical path are varied in length according to the cosine function of the angle thereby to maintain the length of said optical path substantially constant.

3. The improvement according to claim 2 further defined by:
    a. said pivot means including movable pivot means mounting said one mirror for pivoting movement about an axis parallel with and generally equidistant of the opposite edges thereof;
    b. said pivot means including fixed pivot means mounting the other mirror for pivoting movement about an axis parallel with and generally equidistant of the opposite edges thereof;
    c. said pivot means also including a linkage assembly connecting said mirrors in parallel relationship; and
    d. said cam means being engaged with said movable pivot means for imparting reciprocal movement thereto.

4. The improvement according to claim 2 further defined by:

a. said pivot means including movable pivot means mounting said one mirror, said movable pivot means cooperating with said cam means such that said one mirror pivots about an axis contained in the plane of the face thereof and which shifts from one edge of said one mirror to the opposite edge thereof about an arcuate path;

b. said pivot means also including fixed pivot means mounting the other mirror for pivoting movement; and c. said pivot means also including a linkage assembly connecting said mirrors.

5. The method of scanning a document supported on a flat platen for projecting information on a line-by-line basis to a moving image recording surface, said method comprising the steps of:

a. pivoting plural mirrors and maintaining a parallel relationship between said mirrors at all times during their pivoting movement thereby to establish a constantly moving folded optical path between said platen and said moving surface thereby to scan a document on a line-by-line basis from one edge to the opposite edge thereof; and b. shifting one of said mirrors during said oscillation thereby imparting a compound motion thereto for maintaining the length of said optical path constant during scanning.

6. The method of scanning a document from one edge to the opposite edge thereof, wherein such document is supported on a flat platen for projecting information on a line-by-line basis to a moving image recording surface, said method comprising the steps of:

a. providing at least two mirrors and a lens to establish a folded optical path between said platen and said surface, with end portions of said path being perpendicular to said platen and said surface respectively;

b. oscillating both of said mirrors about respective axes contained within the planes of the faces of said mirrors; and c. shifting one of said mirrors only along a path having a length substantially less than the distance between said document edges, such shifting movement being imparted to said one mirror simultaneously with said oscillating movement of both mirrors thereby varying an angle, formed by adjoining portions of the optical path, according to the tangent function of the angle and thereby varying the length of at least two portions of the optical path according to the cosine function of the angle, whereby the length of the optical path is maintained constant during scanning.

7. In a system of the type adapted to scan a document placed on a flat platen for projecting information contained thereon on a line-by-line basis to a moving image recording surface, the improvement comprising:

a. a lens;

b. a first mirror;

c. a second mirror;

d. a linkage assembly connecting said first and second mirrors in parallel relationship;

e. means mounting said mirrors to define a folded optical path passing through said lens and extending between said platen and said surface with the respective end portions of said path being perpendicular to said platen and said surface and with said second mirror being disposed between said first mirror and said lens, said mounting means including means for oscillating said mirrors about respective axes thereof and for shifting only one of said mirrors during said oscillating movement so that an angle defined by adjoining portions of the optical path is varied according to the tangent function of the angle and so that at least two portions of the optical path are varied in length according to the cosine function of the angle thereby to maintain the length of the optical path constant during scanning.

8. The improvement according to claim 7 further defined by:

a. said one mirror being said second mirror;

b. said mounting means including fixed pivot means for said first mirror;

c. said mounting means including movable pivot means for said second mirror; and d. cam means engaged with said movable pivot means thereby to impart compound pivoting and reciprocal movement to said second mirror.

9. The improvement according to claim 7 further defined by:

a. said one mirror being said first mirror;

b. a rectilinear cam element;

c. an arcuate cam element arranged to be engaged by said rectilinear cam element;

d. said mounting means including support means mounting said first mirror for movement with one of said cam elements and for fixedly mounting the other of said cam elements thereby to provide said shifting movement for said first mirror; and e. fixed pivot means mounting said second mirror.

10. The improvement according to claim 7 wherein said mounting means oscillates each of said mirrors through a relatively small acute angle.

11. The improvement according to claim 10 wherein said acute angle is in the order of thirty degrees.

12. A scanning system adapted to scan alternately from two parallel, spaced, flat platens for projecting information on a line-by-line basis from the selected platen to a single, moving, image recording surface, said system comprising:

a. a lens;

b. first, second and third mirror carriages connected together by a linkage system for simultaneous movement;

c. a first mirror mounted on said first carriage by selector means permitting the first mirror alternately to occupy either of two positions relative to the first carriage;

d. a second mirror mounted on said second carriage and cooperating with said first mirror, when the same occupies one of said positions, to define a first folded optical path passing through said lens and extending between one of said platens and said surface;

e. a third mirror mounted on said third carriage and cooperating with said first mirror, when the same occupies the other of said positions, to define a second folded optical path passing through said lens and extending between the other of said platens and said surface;

f. drive means engaged with said linkage assembly for oscillating all of said mirrors about respective transverse axes; and g. cam means cooperating with said drive means for shifting at least one of said mirrors during such oscillatory movement so that an angle defined by adjoining portions of the selected one of said first and second optical paths is varied according to the tangent function of the angle and so that at least two portions of the selected optical path are varied in length according to the cosine function of the angle thereby to maintain the length of the selected optical path constant during scanning.

13. The system according to claim 12 further defined by:
   a. said drive means being connected to said first carriage; and
   b. clutch means operable in response to positioning of said first mirror by said selector means for alternately engaging said second and third carriages with said first carriage.

14. The system according to claim 12 further defined by:
   a. said one mirror being said first mirror;
   b. said linkage assembly including separate fixed pivot means for said second and third carriages; and
   c. said linkage assembly including movable pivot means for said first carriage, said cam means being engaged with said movable pivot means thereby to impart reciprocal movement to said first carriage.

15. The system according to claim 12 further defined by:
   a. said linkage assembly including fixed pivot means for said first carriage; and
   b. said cam means including a pair of rectilinear cam elements in engagement with a pair of arcuate cam elements, respectively, one of said pair of cam elements being connected with respective second and third carriages, the other pair of cam elements being fixed thereby to impart said shifting movement to both of said second and third mirrors.

16. The system according to claim 12 wherein said linkage assembly is adapted to oscillate said mirrors through a relatively small acute angle during each stroke of the scanning cycle.

17. The system according to claim 16 wherein said acute angle is in the order of thirty degrees.

18. In a system of the type adapted to scan a document placed on a flat platen for projecting information contained thereon on a line-by-line basis to a moving image recording surface, the improvement comprising:
   a. a lens;
   b. a first mirror;
   c. means mounting said first mirror for oscillating movement about an axis thereof for scanning said platen from one edge to the opposite edge thereof;
   d. a second mirror having an area substantially less than the area of the first mirror;
   e. a linkage arrangement connecting said first and second mirrors in parallel relationship to define a folded optical path passing through said lens and extending between said platen and said surface, with respective end portions of the path being perpendicular to said platen and said surface and with the second mirror being disposed between said first mirror and said lens; and
   f. cam means cooperating with said linkage arrangement to impart bodily shifting movement to one of said first and second mirrors thereby to maintain the length of said optical path constant.

19. The improvement according to claim 18 further defined by:
   a. said one mirror being said second mirror;
   b. said mounting means supporting said first mirror for oscillating movement about a fixed pivot axis contained within the plane of said first mirror; and
   c. said second mirror being supported by movable pivot means, said cam means cooperating with said movable pivot means thereby to impart reciprocal movement thereto.

20. The improvement according to claim 19 wherein said first and second mirrors are oscillated through a relatively small acute angle and wherein the stroke of reciprocal movement imparted to said second mirror is substantially less than the length of the document to be scanned.

21. The improvement according to claim 18 further defined by:
   a. said one mirror being said first mirror; and
   b. said cam means including a rectilinear cam element engaged with an arcuate cam element, one of said cam elements being mounted with said first mirror for movement therewith, the other of said cam elements being fixed thereby to impart said bodily shifting movement to said first mirror.

22. The improvement according to claim 21 wherein said first and second mirrors are oscillated through a relatively small acute angle.

23. The method of scanning a document supported on a flat platen comprising the steps of:
   a. providing a first mirror and oscillating said first mirror through a relatively small angle and about an axis contained within the plane thereof for scanning a flat document on a line-by-line basis from one edge to the opposite edge thereof;
   b. providing a second smaller mirror and oscillating the same simultaneously with said first mirror;
   c. maintaining a parallel relationship between said first and second mirrors at all times during said oscillating movement; and
   d. imparting bodily shifting movement to one of said mirrors simultaneously with said oscillating movement thereby to define a constant length folded optical path passing through a lens and extending from said platen to said surface, with the respective end portions of said optical path being perpendicular to said platen and said surface.

* * * * *